Oct. 25, 1966  W. ANDERSEN  3,281,228
CYLINDER FOR GLASS BOTTLE MAKING MACHINE
Filed Oct. 17, 1962  4 Sheets-Sheet 1

INVENTOR.
Walter Andersen
BY Stone, Nierman,
Burmeister and Zummer
Attys.

Oct. 25, 1966 W. ANDERSEN 3,281,228
CYLINDER FOR GLASS BOTTLE MAKING MACHINE
Filed Oct. 17, 1962 4 Sheets-Sheet 2
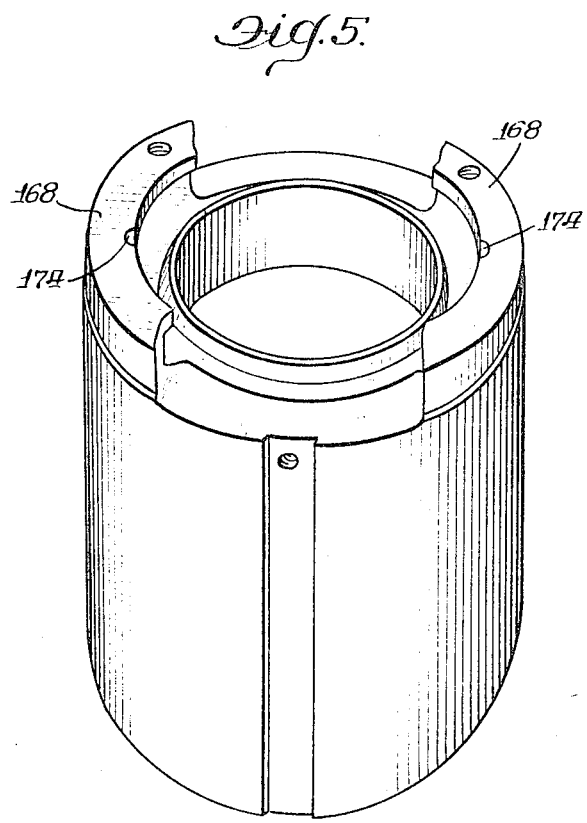
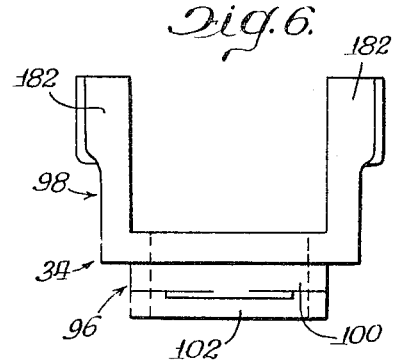
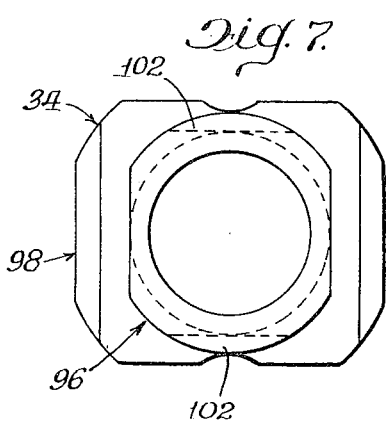
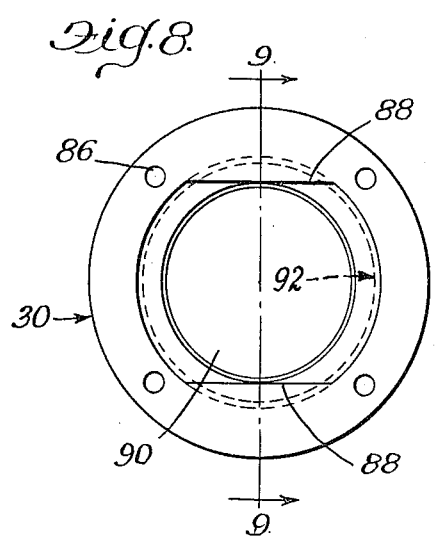
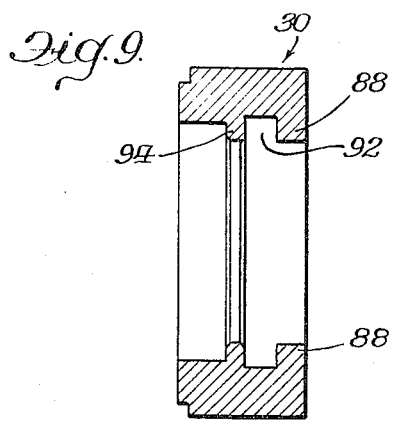
INVENTOR.
Walter Andersen
BY Stone, Nierman,
Burmeister and Zimmer
Attys.

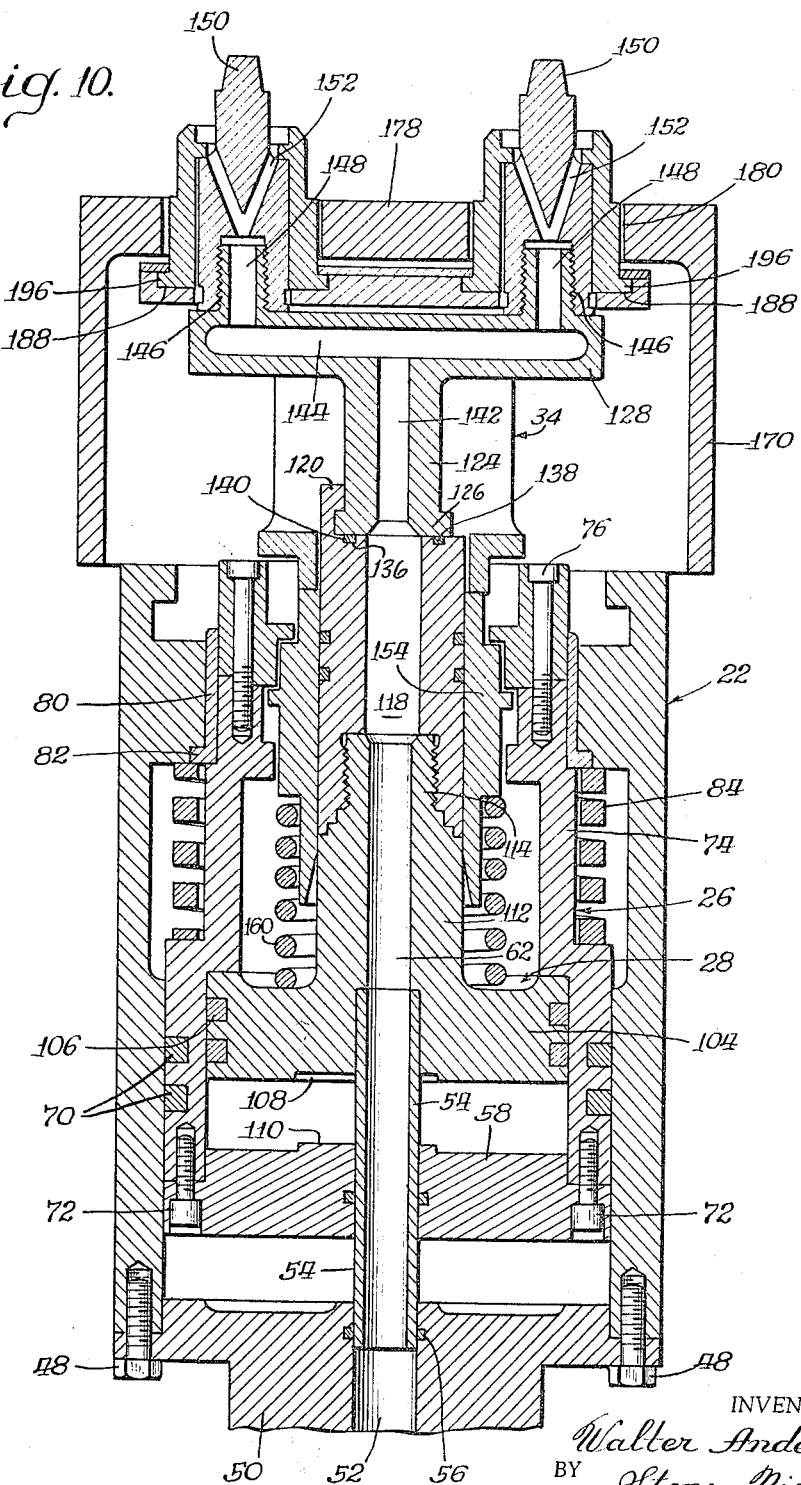

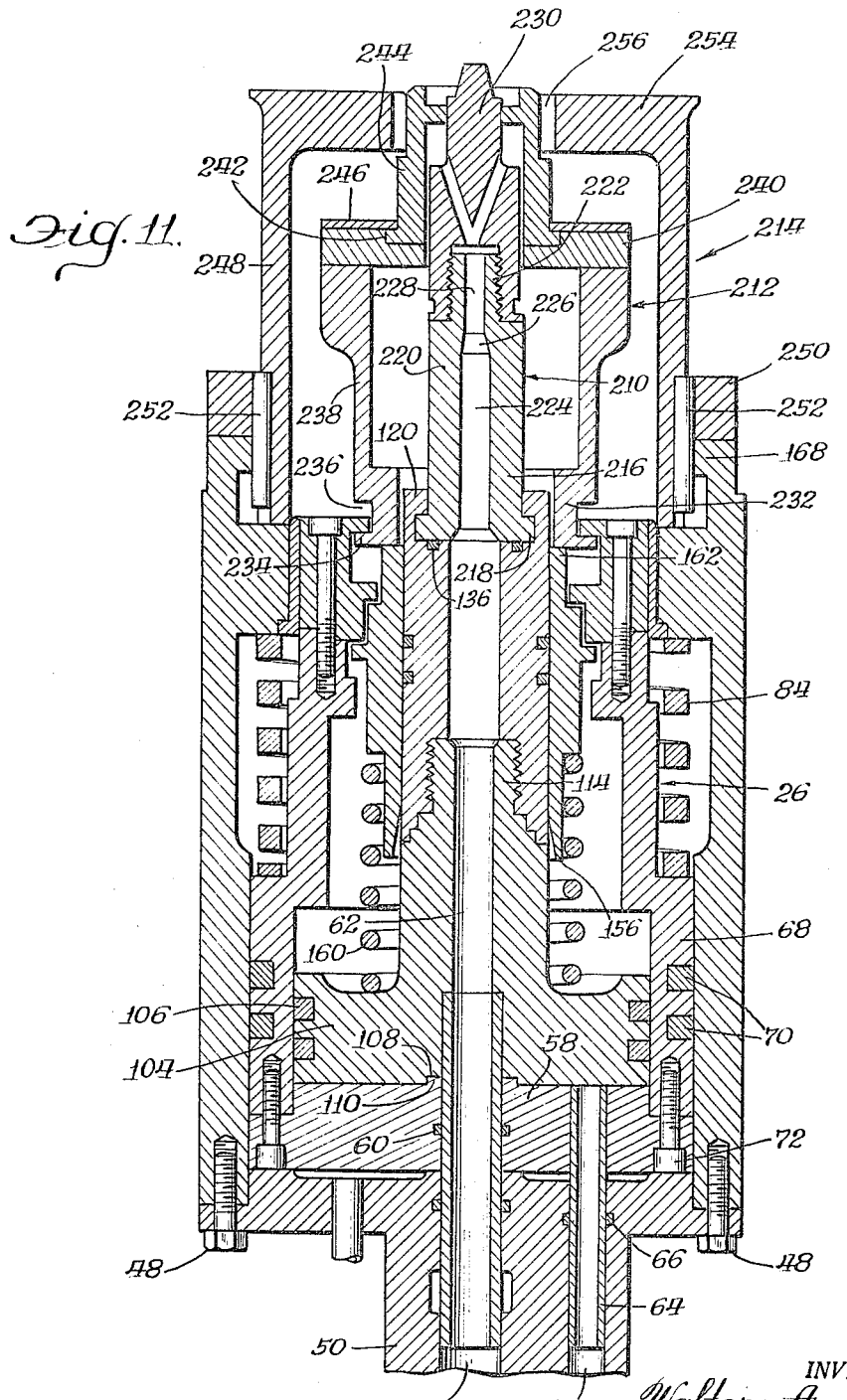

United States Patent Office 3,281,228
Patented Oct. 25, 1966

3,281,228
CYLINDER FOR GLASS BOTTLE
MAKING MACHINE
Walter Andersen, Streator, Ill., assignor to Chem-Met-Andersen Engineering Company, Chicago, Ill., a corporation of Illinois
Filed Oct. 17, 1962, Ser. No. 231,086
7 Claims. (Cl. 65—167)

This invention relates to the parison mold section of a glass bottle making machine including an improved cylinder which in combination with the ring neck mold maintains a superior seal so that air with foreign particles will not enter the air line through joints in the cylinder when the air pressure is low (which is the major step in applicant's invention eliminating settle-blow in bottles, U.S. patent application Ser. No. 30,818, filed May 23, 1960); nor will air escape from this same air line when its pressure is high during the immediately succeeding blowing step. The seal is important in applicant's process because it makes it possible to reverse almost instantly the direction of air flow in the air line, that is, change from a pressure of 3 to 5 pounds to 40 pounds. More particularly, the invention relates to an improved cylinder construction which allows the thimble and plunger to be vertically removed from association with the cylinder and from each other and which are internally locked to one another.

In the present I. S. Hartford machine, a cylinder vertically disposed is mounted on a base. Within the cylinder is a piston upon which is mounted a thimble carriage. This piston has coaxially of its interior a piston chamber in which is mounted a plunger piston. Mounted on the top of the thimble carriage is a thimble and this thimble is held to the thimble carriage by a pair of confronting external C-keys. Mounted on the plunger piston is a plunger having an axial bore through which air may be forced in either direction. The plunger is held to the piston and its rod by a pair of external plunger keys. Mounted above both plunger and thimble is a plate with openings through which the thimble and the plunger may pass. This plate is mounted on the base and has a flat top surface. Mounted to one side of this plate is an invert arm which may be pivoted through an arc lying in a vertical plane. This arm carries a bottle ring neck mold. The opening of the mold registers with the top of the plunger. Mounted above the ring neck mold on vertical axes are two halves of a parison mold, commonly called the blank mold. These two halves swing on vertical pivots.

The equipment thus described include both the I. S. Hartford machine, namely, the blow-and-blow method, and also the so-called "62" machine, which is the press-and-blow method. By either method, a gob of glass is dropped into the top of the parison mold. This glass enters at 1600–1700° F. and is quite fluid. It descends to the bottom of the parison mold and into the ring neck mold where it is hardened, and by careful adjustment of the position of the plunger is stopped at the bottom of the ring neck mold. However, fine particles of glass solidify and they tend to descend through the orifice of the ring neck mold into the interior of the plunger and into any crevice which is available. These crevices, usually between planes normal to the axis of the plunger have slight clearances, as much as 30/1000 of an inch when the equipment is new. In either, the blow-and-blow process, or the press-and-blow process, there is a period when air under 45 pounds or thereabouts of pressure is forced through the hollow plunger into the parison mold. This air establishes pressures wherever it can inclusive of the passageways between the flat surfaces heretofore mentioned and the keys. It forces the keys outwardly and when a machine is operating at 40 or 50 cycles a minute for each parison mold, the rings are vibrating in a horizontal plane 40–50 times a minute. Since this vibration is caused by air, it is self-evident that any glass particles carried by the air will move between the flat surfaces and against the rings with the result that wear is exceedingly high. This wear has the effect of establishing air leakage in the system with consequent loss of pressure during what is called the counter-blow. Simultaneously, and more importantly to the applicant, who is the inventor of the vacuum system for avoiding settle blow identified above, this wear by the glass particles destroys the seal with resultant loss of efficiency during the vacuum step.

The first object of this invention is to establish a conduit for the flow of air in either direction from the orifice of the ring neck mold to the source of air pressure. A feature of this invention is the elimination of the external locking keys and the substitution therefor of a lock which holds the component parts together immediately adjacent to the conduit but internally of both the cylinder and the thimble carriage. This feature seals in the air irrespective of the direction in which the air is moving in the air line and therefore seals in the fine glass particles which abrade and damage the engaging surfaces of the parts.

A second object of this invention is to reduce the number of parts and to provide a universal lock which makes it possible to hold thimbles of various sizes in a single cylinder suck and blow, blow-and-blow section, a single cylinder suck, press-and-blow, press-and-blow section, a single cylinder double gob blow-and-blow only, and a double cylinder double gob blow-and-blow or press-and-blow section. A feature of the invention is the shaping of the thimble, the plunger holder, the thimble carriage, and the spring so that they may be successively removed from one end, that is, the upper end of the cylinder. The plunger head lock and the thimble lock to the thimble carriage are both engageable by working from above so that when the machine is hot and it is necessary to remove any one of these parts, applicant is able to remove successively the parts working from the top down and this by only turning one part with respect to another by approximately 90°. At the present time, with the keys, it is necessary to get into very awkward positions to remove the keys. This may require as much as 25–30 minutes to replace merely the plunger holder. Moreover, in the case of double gob machines, at the present time, it is necessary to remove what is called the "turtle plate," which carries one of the ring locks that hold the keys in position. The plate above the turtle neck and the turtle neck cannot be removed without first taking off the parison molds themselves. With applicant's invention, no more space is required above the top of the thimble than that provided by a space contained in a cylinder extending above the thimble and since this space is open when the parison molds are open, it is unnecesary to remove the parison molds.

Another object of this invention is to reduce the costs of the component parts. This is incidental to the last preceding object and results from a great diminution of parts each of which is subject to the wear caused by flying glass particles.

Another object of this invention is ancillary to the foregoing, namely, to make it possible to remove the cylinder itself for repair purposes, quickly replacing it.

These and such other objects will become readily apparent to those skilled in the art by a perusal of the following specification in light of the accompanying drawings, in which:

FIGURE 5 is a perspective view of the tube of the cylinder shown in FIGURE 1;

FIGURE 6 is a side elevation of the thimble mount shown in FIGURE 1;

FIGURE 7 is a bottom view of the thimble mount shown in FIGURE 6;

FIGURE 8 is a top view of a top head lock shown in FIGURE 1;

FIGURE 9 is a cross-sectional view taken on line 9—9 of FIGURE 8;

FIGURE 10 is a cross-sectional view taken on line 10—10 of FIGURE 1 but with the cylinder shown in the up position, that is, with the thimbles and plungers in the up position; and FIGURE 11 is a cross-sectional view of a cylinder embodying the hereindisclosed invention but with a single thimble and plunger mounted on the cylinder.

Figure 1:
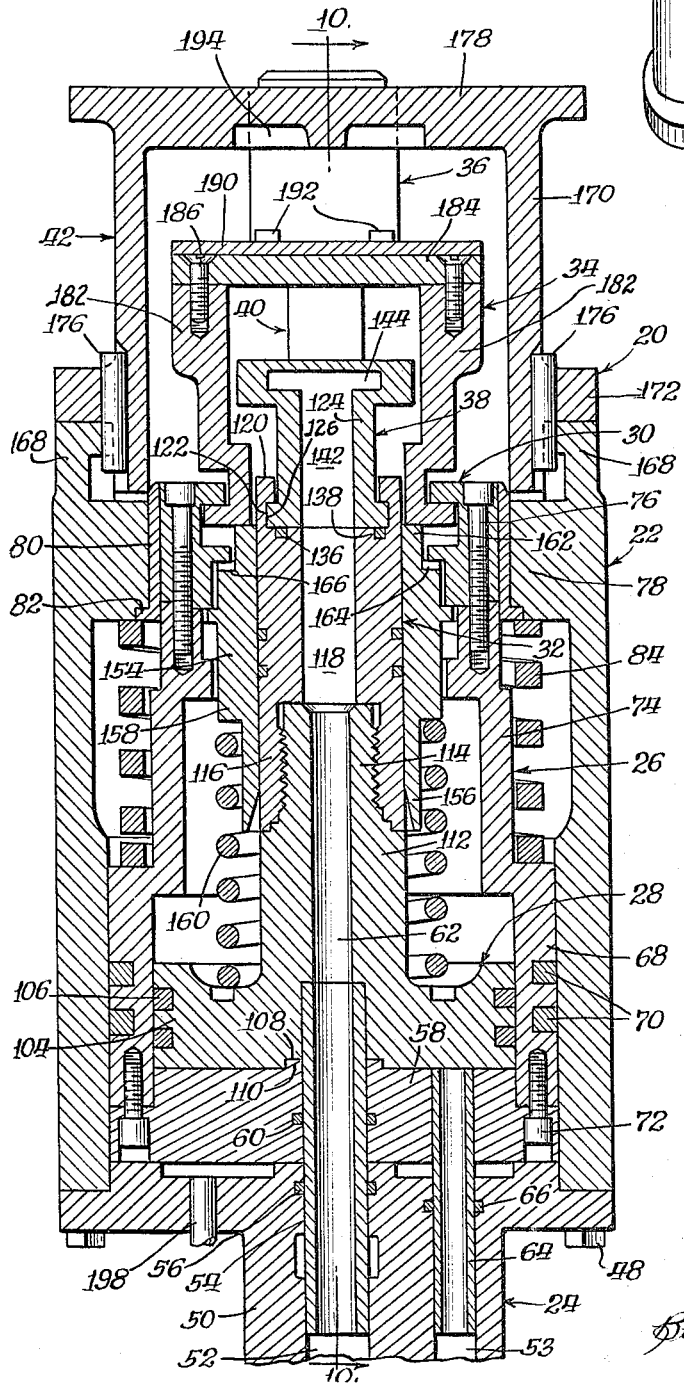
FIGURE 1 is a cross-sectional view of a cylinder embodying the instant invention and with one of two plungers mounted on the cylinder.

Referring now to the drawings and especially to FIGURE 1, it may be seen that a cylinder 20 embodying the hereindisclosed invention generally consists of a cylinder tube 22 having a cylinder support 24 sealing mounted on one end, a thimble carriage 26 slideably mounted in the cylinder tube, a plunger piston 28 slideably mounted in the thimble carriage and being concentric therewith, a top head lock 30 fixed to the thimble carriage, a plunger guide lock 32 threadedly connected to the plunger piston 28, a thimble mount 34 removably connected to the top head lock, identical thimbles 36 connected to the thimble mount, a plunger mount 38 removably connected to the plunger guide lock 32, a pair of identical plungers 40 fixed to the plunger mount 38 and being slideable within their respective thimbles 36, and a turtle shell 42 removably mounted on the cylinder tube 22 and slideably receiving the thimbles 36.

The instant cylinder 22 is mounted in a parison mold section of a conventional glass bottle making machine. Inasmuch as the various parts of the glass bottle making machine are well-known, these parts are not shown nor described in detail. Looking now to FIGURE 4, it may be seen how the instant thimble and plunger are used in cooperation with a conventional ring neck mold 44 for forming a blank or parison in a parison mold 46. The various parts associated with the ring neck mold and parison such as invert arms, hangers and air towers are well-known in the art and are not disclosed in detail herein though occasional reference may be made thereto.

Considering now the specific construction of the instant cylinder, it may be seen that the cylinder tube 22 is conventional in its construction. The cylinder 22 has the cylinder support 24 fixed to its lower end by bolts 48. The support 24 includes a stool 50 which has a pair of elongated air apertures 52 and 53 extending axially in the stool. The aperture 52 has a tube 54 slideably mounted therein and a seal 56 is positioned in engagement with the tube 54 to seal the space between the support and the tube. The tube 54 is slideably mounted in a thimble base plate 58, and a seal 60 seals the space between the base plate and the tube. The tube 54 is fixed in the plunger piston 28 which plunger piston has an axial opening 62 extending therethrough for reasons which will become apparent hereinafter. A second tube 64 is slideably mounted in the axial opening 53 and a seal 66 is provided between the support and the tube 64. The tube 64 extends through the thimble base plate 58 and is fixed therein so that air under pressure may flow through opening 53 and into the space between the plunger piston and the thimble base plate to urge the plunger piston upward. The tube 64 provides the dual function of providing a conduit for air and providing a means for preventing rotation of the thimble carriage 26 relative to the stool.

As is clear in FIGURE 1, the thimble carriage 26 includes a piston portion 68 which has a pair of rings 70 which slideably engage the interior wall of the cylinder 22 and form a seal therebetween. The piston portion 68 mates with the thimble base plate 58 and the base plate and thimble carriage are held together by a plurality of screws 72. Formed integral with the piston portion 68 is a support portion 74 which has the top head lock 30 secured thereto by a plurality of screws 76.

On the upper portion of the cylinder 22, there is an enlarged annular shoulder 78 into which is press fitted a sleeve 80. The sleeve 80 includes an annular lip 82 which is in engagement with the enlarged shoulder 78 so that the sleeve is held in one axial direction, that is upward. A thimble spring 84 is positioned in an engagement with the sleeve 82 thus holding the sleeve in the opposite direction. The other end of the spring engages the piston portion 68 of the thimble carriage so that the spring provides a dual function of holding the sleeve and acting as a return means for the thimble carriage.

Looking now to FIGURES 8 and 9, the top head lock 30 is shown in detail therein. The sleeve 80, shown in FIGURE 1, slideably receives the top head lock 30. As is evident in FIGURE 8, the top head lock has a plurality of screw apertures 86 which receive the screws 76. Adjacent to the upper surface of the top head lock, there is a pair of integral opposed shoulders 88 which define a non-circular aperture 90. A groove 92 extends around the interior of the top head lock below the ledges 88. An annulus 94 is formed integral with the top head lock to provide a guide for the top head lock. As was mentioned above, the thimble mount 34 is removably mounted in the top head lock.

The thimble mount 34 is clearly shown in FIGURES 6 and 7, and FIGURES 1 and 10 show how the thimble mount is used in a double gob operation. The thimble mount generally includes a thimble mount base 96 with a support portion 98 formed integral therewith. The base 96 as is clear from FIGURE 7 is non-circular and it is mateable with the opening 90 of the top head lock. The base 96 has a groove 100 formed therein which groove forms locking shoulders 102. It is evident that the base of the plunger mount may be dropped into the aperture 90 until the base engages the annulus 94. The plunger mount is then rotated 90 degrees about the axis of the cylinder so that the locking shoulders 102 are positioned beneath the locking ledges 88, thus, locking the plunger mount to the top head lock. However, the thimble mount is readily removable by simply rotating the thimble mount and lifting it from the top head lock.

Reciprocally mounted within the piston portion 68 of the thimble carriage is the plunger piston 28. The plunger piston includes a piston portion 104 which carries piston rings 106. The piston rings 106 engage the interior wall of the piston portion 68 to form a seal therebetween. A rotational locking means is provided between the piston portion 104 and the thimble base plate 58. The piston portion 104 has an elongated recess 108 which receives a boss 110 formed on the base 58. It may be readily appreciated that with the boss positioned in the recess 108 no rotation may occur between the plunger piston 28 and the thimble carriage 26. The piston portion 104 has formed integral therewith a shank portion 112 which has extending therethrough the aperture 62 and formed integral with the upper portion of the shank is a threaded shank portion 114. Threadedly connected to the threaded shank portion 114 is the plunger guide lock 32.

The plunger guide lock is generally cylindrical in form and has an internally threaded portion 116 which mates with the threaded portion 114 of the plunger piston shank. The guide lock includes an elongated aperture 118 which is merely an extension of the aperture 62. Formed integral with the upper end of the guide aperture is a C-shaped locking shoulder 120 which has a groove 122 formed below it. The plunger mount 38 is removably connected to the plunger guide lock.

Figure 2:
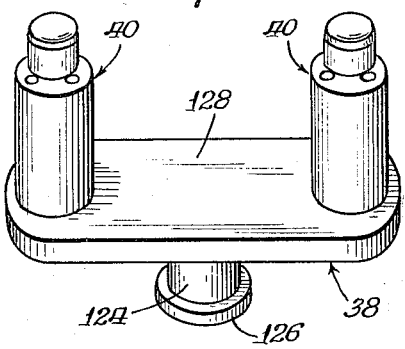
FIGURE 2 is a perspective view of a double plunger mount with two plungers fixed thereon.

The plunger mount 38 includes a base 124 which has an annulus 126 formed integral therewith, FIGURE 2. The plunger mount also includes a bench 128. The annulus 126 is positioned below the shoulder 120 of the plunger guide lock and in groove 122. A seal is positioned between the bottom of the base of the plunger mount and the plunger guide lock. The plunger guide lock includes an annular groove 136 with a virgin Teflon annulus 138 positioned in the groove. The annulus 138 is resilient and slightly larger than the groove so that the resilience of the annulus keeps the annular portion 126 of base 124 in engagement with the C-shaped locking shoulder 120 whereby the annulus 138 performs a dual function of locking the plunger mount to the plunger guide lock and sealing the space between the plunger mount and the plunger guide lock. The plunger guide lock has an angularly disposed aperture 140 intersecting the annular groove 136 to provide a passage for insertion of a tool to remove the seal 138 from the plunger guide lock.

The plunger base 124 includes an axial aperture 142 which is aligned with aperture 118. The bench 128 is hollow in that it includes an aperture 144 which opens into the axial aperture 142. The bench has a pair of threaded studs 146 positioned on opposite ends of the bench. The studs contain apertures 148 which open into the aperture 144. Threadedly mounted on the studs 146 are the plungers 40. The plungers 40 are conventional in construction in that they include rams 150 and air passages 152 which communicate with the apertures 148.

Slideably receiving the plunger guide lock is a plunger guide lock sleeve 154. The plunger guide lock sleeve includes a sleeve portion 156 having a shoulder portion 158 formed integral therewith. A plunger piston spring 160 engages the shoulder 158 and the piston portion 104 of the plunger piston. One end of the sleeve 156 engages the base of the thimble mount so that the spring 160 performs the dual function of acting as a return means for the plunger piston and a means for holding the locking ledges of the thimble mount in engagement with the locking shoulders of the top head lock to hold the thimble mount with respect to the top head lock. The plunger guide lock sleeve has a reduced portion 162 which passes through the annulus 94 of the top guide lock so that the sleeve 156 is guided by the top head lock. The shoulder portion 158 has vent apertures 164 and 166 formed on the side adjacent to the annulus to allow for air to vent out from inside the thimble carriage when the plunger piston is raised.

The cylinder 22 (FIGURE 5) has in its uppermost portion a pair of C-shaped shoulders 168 which receive the turtle shell 42. The turtle shell 42 includes a generally egg-shaped outside wall 170 (FIGURE 1) which is positionable between the shoulders 168 of the cylinder. Formed integral with the wall 170 is a mounting flange 172 which is engageable with the shoulders 168. Each of the shoulders 168 has a recess 174 and the turtle shell has a pair of pins 176 fixed in the flange 172 and positionable in the recesses 174 to hold the turtle shell against rotation. Formed integral with the wall 170 is a turtle shell top 178 which has a pair of plunger apertures 180. The thimbles 36 are movably positioned in the apertures 180.

The mounting portion 98 of thimble mount 34 includes a pair of mounting arms 182. A thimble mounting plate 184 is secured to the mounting arms 182 by a plurality of screws 186. The mounting plate has a pair of recesses 188 (FIGURE 10) at opposite ends of the plate and the centers of the recesses are equidistant to the centers of the studs 146 on the plunger mount. Each of the thimbles 36 is positioned in respective recesses 188 and an apertured locking plate 190 is secured to the thimble mounting plate by a plurality of screws 192 which extend above the surface of the plate and hold the thimbles onto the thimble mount. The top 178 of the turtle plate is recessed with recesses 194 to accommodate the screw heads of screws 192. The thimbles 36 are conventional in construction in that they have annular flanges 196 which hold the thimbles in position within the recesses and in engagement with the locking plate 190. The thimbles 36 slidably receive the plungers 40 in a conventional manner. The plunger mount which is positioned between the arms of the thimble mount is free to move between the bottom of the thimble mounting plate 184 and the top of the base 96 of the thimble mount.

Figure 4:
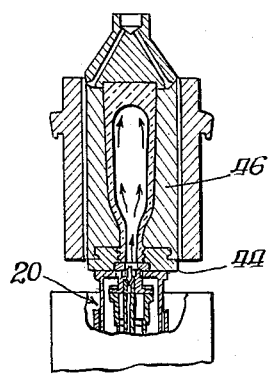
FIGURE 4 is a cross-sectional view of a plunger and thimble shown in cooperation with a ring neck mold and a parison mold with a blank being blown in the parison mold.

As was mentioned above, the operation of the plungers and thimbles mentioned herein is identical to the conventional well-known operation of the thimble and plunger for cooperation with a ring neck mold and parison mold of a glass bottle making machine such as that shown in FIGURE 4. In order to raise the thimble with the instant device, air is supplied from a conventional source which is not shown in this instance through a port 198 in the support 24 to the space between the support 24 and the bottom of the thimble base plate thus moving the thimble carriage 26 upward against the force of spring 84. It should be noted that as the thimble carriage moves upward the plunger piston along with the plunger mount also moves upward so that the thimbles are moved upward out of the turtle shell and into cooperation with the ring neck mold. As is evident from FIGURE 1, as the thimble carriage is moved upward, the tubes 54 and 64 slide upward in the support thus maintaining contact with their respective apertures. With the thimble in its proper position in the ring neck mold, the plunger may be extended depending upon the operation being used. In order to extend the plunger, air under pressure is supplied to aperture 53 so that the piston portion 104 of the plunger piston leaves the thimble base. As the piston moves upward, the plunger mount is moved upward so that the plunger is pushed up toward the parison mold and spring 160 is compressed. It should be noted that any air within the thimble carriage is expelled through the vents 164 and 166 so that there is little or no back pressure built up when the plunger is extended.

In order to retract the plunger the pressure is relieved in aperture 58. With the pressure relieved the spring 160 pushes the plunger piston down toward the thimble carriage base thus pulling down the plunger relative to the thimble.

Air under pressure is readily provided to the parison mold when the plungers are withdrawn by providing air under pressure to aperture 52 in a conventional and well-known manner and to the plungers through an air line defined by the apertures in the cylinder. The air flows along tube 54 through aperture 62 and into aperture 118. From aperture 118, the air flows into the plunger mount and along aperture 142, and thence into the aperture 144. The air divides and flows up the respective apertures 148 of the threaded studs 146 and then through the air passages 152 in the plungers and on up into the parison mold. In order to retract the thimbles from the parison molds, the air pressure between the thimble base plate and the support is relieved so that the spring 84 may push down the thimble carriage and with it the thimble mount to retract the thimbles and to further retract the plungers which travel with the thimble carriage. From the foregoing, it is apparent that the instant cylinder operates in a normal fashion.

When it is necessary to change the thimbles and plungers either because the thimbles and plungers have become worn or a new job is to be run, it is a very simple matter to do so with the present device. The parison mold need not be removed but simply opened, and the cylinder does not have to be removed from its section. The turtle shell 42 is simply lifted from the cylinder. Thus, the thimble mount is exposed. In order to remove the thimble mount, a downward force is applied to the thimble mount, and the thimble mount is rotated 90 degrees rotating with it the plunger mount until the base of the plunger mount registers with the aperture in the top head lock. The plunger mount may then be moved upward until the base engages the bottom of the plunger bench. It may be necessary to move the plunger piston up slightly so that the plunger mount clears the top head lock. The plunger mount with the thimble mount may then be moved radially of the plunger guide lock to disengage the plunger mount from the plunger guide lock. The plunger mount and the thimble mount may then be removed and a new set may be installed by simple using the reverse order.

In order to make minor repairs on the instant cylinder, it is apparent that these repairs may be easily made and the repairs may be made from the top without removing the entire cylinder from its machine. In the event it is desired to remove the plunger guide lock, it is necessary to rotate the plunger piston until the elongated boss 110 mates with the aperture 108 and the plunger piston and base are non-rotatably locked together. The thimble carriage is also non-rotatable relative to the cylinder and of course the cylinder is fixed to the bottle making machine frame. The plunger guide lock is rotated so that the threads are disengaged. Further disassembly may be accomplished by removing screws 76 to remove the top head lock so that the plunger guide lock sleeve may be removed as well as the plunger spring 160. It is thus apparent that maintenance and repairs may be easily accomplished without removing the entire cylinder from the bottle making machine thereby keeping "down time" to a minimum.

The same cylinder may be used as a single gob cylinder by changing the plunger mount and its associated parts, the thimble mount and its associated parts, and the turtle shell. FIGURE 11 shows how the cylinder may be used in single gob operation.

The cylinder shown in FIGURE 11 is different from the above described cylinder only in that a single plunger mount 210 is removably connected to the plunger guide lock 32, a single thimble mount 212 is removably connected to the top head lock 30, and a turtle shell 214 having a single aperture is removably mounted on top of the cylinder 22.

The plunger mount 210 includes a base 216 which has an annulus 218 formed integral therewith. The annulus 218 is positioned under the C-shaped shoulder 120 of the plunger guide lock to hold the plunger mount in an axial direction. The sealing ring 136 is positioned between the plunger mount 210 and the plunger guide lock 32. The plunger mount 210 also includes a bench 220 and a threaded stud 222 formed integral with the bench. The plunger mount is apertured in that an aperture 224 extends through the base to open into an aperture 226 which communicates with an aperture 228 in the stud 222. A plunger 230 is threadedly mounted on the stud 222 and the plunger 230 is identical in construction to the plungers 150 described above.

Figure 3:
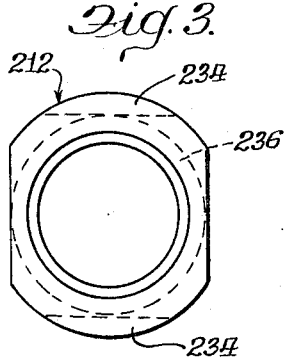
FIGURE 3 is an end view of a thimble mount for a single thimble.

The thimble mount 212 is similar in construction to the thimble mount 34. The thimble mount 212 includes a base 232 which is identical to the base 96 of the thimble mount 34. The base of the thimble mount 212 is shown in FIGURE 3 of the drawing. The base includes a pair of locking ledges 234 which define a noncircular base and which ledges are engageable with the locking shoulders 88 of the top head lock 30. The base 232 also has an annular groove 236 which is identical to groove 100. The thimble mount includes a mounting portion 238 which has a thimble plate 240 secured thereto. The thimble plate contains a recess 242 which has mounted therein a thimble 244, which thimble 244 is identical in construction to the thimbles 36 described above. The thimble 244 is secured to the thimble plate by a thimble locking plate 246. As is evident in FIGURE 11, the plunger 230 is slideably mounted in the thimble 244.

The turtle shell 214 is similar in construction to the turtle shell 42. Turtle shell 214 includes a mounting wall 248 with a mounting ledge 250 formed integral therewith which mounting wall is cooperative with the ledges 168 of the cylinder 22. A pair of pins 252 are fixed in the turtle shell and the pins 252 are positionable in the recesses 174 as are pins 176 of the turtle shell 42. A top 254 is formed integral with the wall 248 and the top has a single aperture 256 through which the thimble 244 reciprocally passes. It may be noted that the sole distinction between the turtle shell 214 and the turtle shell 42 is that the turtle shell 214 has a single aperture in its top.

From the foregoing description it is readily apparent that the cylinder 20 may be readily converted from a cylinder operative with a double gob mold to a single gob mold or from a single gob mold to a double gob mold. The time involved in the change is held to an absolute minimum.

In the event that the cylinder is operating as a single plunger cylinder and it is desired to convert to a double plunger cylinder, the turtle shell 214 is simply lifted off the cylinder exposing the thimble mount 212. The thimble mount is rotated 90 degrees in the top head lock 30, and the plunger mount is moved radially of the plunger guide lock to disengage the plunger from the plunger guide lock. The plunger mount 32 and the thimble mount 34 may be then appropriately connected to the cylinder in the manner described above and the turtle shell 42 may then be placed on the cylinder and the cylinder is ready for use with a double gob mold. The entire time for conversion is thus held to a minimum.

From the foregoing description of both the double plunger and single plunger mounts, it is readily apparent that irrespective of the number of plungers, the air conduit from the plungers to the source of air is positively sealed, and the cylinder may be used either to provide air under pressure to the plungers or to evacuate air from the plungers equally efficiently. The plungers are fixed to the plunger mount and the connection between the plunger mount and the plunger guide lock is such that there is an effective seal irrespective of whether the pressure in the plunger guide lock is high or substantially below atmospheric.

It is also readily apparent that by use of the herein disclosed construction the cylinder is not only highly versatile but also it contains a very small number of parts in comparison to the prior art devices. For instance a multiplicity of locking keys for various sizes is eliminated. The present locking is effective and seals are provided in important locations thus reducing the possibility of having glass work into a position where it may do serious damage.

Although a specific construction of the instant invention has been shown and described in detail above and in the accompanying drawings, it is to be expressly understood that those skilled in the art may take various and sundry modifications and changes without departing from the spirit and scope of the instant invention. It is to be expressly understood that the present invention is limited only by the appended claims.

What is claimed is:

1. In a cylindner for use in a glass bottle making machine, said cylinder including a cylinder tube, a thimble carriage movably mounted in the cylinder tube, and a plunger piston movably mounted within the thimble carriage, the improvement comprising, in combination, a top head lock fixed to the thimble carriage, a thimble mount removably connected to the top head lock, resilient means holding the thimble mount in engagement with the top head lock and providing return means for the plunger piston, a plunger guide lock threadedly connected to the plunger piston, a plunger mount removably connected to the plunger guide lock, a thimble mounted on the thimble mount, a plunger mounted on the plunger mount and being slideable through the thimble, and a turtle shell removably mounted on the cylinder tube and having an aperture for slideably receiving the thimble.

2. In a cylinder for use in a glass bottle making machine, the improvement comprising, a plunger for cooperation with a mold, a thimble slideably receiving the plunger, a plunger mount connected to said plunger, a plunger guide lock removably connected to the plunger mount and being connected to a plunger piston, a thimble mount connected to said thimble, said thimble mount having a non-circular base and said base having a pair of outwardly extending locking ledges, a top head lock secured to a thimble piston reciprocally mounted in a cylinder tube for movement within the tube, said top head lock having a pair of integral opposed locking shoulders defining a circular aperture in an upper surface of the top head lock mateable with the non-circular base of the thimble mount, said locking shoulders of the top head lock being engageable with the locking ledges of the thimble mount for locking the thimble mount to the top head lock, whereby the thimble and the plunger may be readily removed by rotating the thimble mount relative to top head lock and lifting the thimble mount from the top head lock and removing the plunger mount from the plunger lock guide.

3. In a cylinder for use in a glass bottle making machine, the improvement comprising, a top head lock secured to a thimble piston reciprocally mounted in a cylinder tube for movement within the tube, said top head lock having a pair of integral opposed locking shoulders to define a non-circular aperture in an upper surface of the top head lock, a thimble mount removably held in the top head lock by said locking shoulders, said thimble mount having a non-circular base mateable with the non-circular aperture in the upper surface of the top head lock and said base having a pair of locking ledges engageable with the locking shoulders to lock the thimble mount in an axial direction, a plunger lock guide sleeve engageable with the thimble mount, a compression plunger spring resiliently urging a plunger piston and the plunger lock guide sleeve in opposite directions to hold resiliently the plunger lock guide sleeve in engagement with the thimble mount and to hold resiliently the locking ledges in engagement with the locking shoulders, a plunger guide lock slideably mounted in the plunger guide lock sleeve and being threadedly connected to the plunger piston, a plunger mount removably connected to the plunger guide lock, a thimble connected to the thimble mount, and a plunger slideably mounted in the thimble and being connected to the plunger mount, whereby the plunger and thimble may be readily removed by rotating the thimble mount relative to the top head lock and lifting the thimble mount from the top head lock, and removing the thimble mount from the plunger lock guide.

4. In a cylinder for use in a glass bottle making machine for cooperation with a mold, the improvement comprising, a plunger cooperative with the mold, a plunger mount connected to the plunger, a thimble cooperative with the mold and slideably receiving the plunger, said plunger mount having an annular flange, a plunger guide lock having a C-shaped locking shoulder formed integral with its upper end and said C-shaped locking shoulder being engageable with the annular flange of the plunger mount, an annular seal positioned between the plunger mount and the plunger guide lock resiliently holding the annular flange of the plunger mount in engagement with the C-shaped locking shoulder and sealing the space between the plunger mount and the plunger guide lock, a plunger lock guide sleeve slideably receiving the plunger guide lock, a thimble mount connected to said thimble and being engageable with the plunger lock guide sleeve, said thimble mount being connected to a thimble piston, a compression plunger spring resiliently urging a plunger piston and the plunger lock guide sleeve in opposite directions.

5. In a cylinder for use in glass bottle making machine, the improvement comprising, a top head lock secured to a thimble piston reciprocally mounted in a cylinder tube for movement within the tube, a thimble mount removably connected to the top head lock, a plunger lock guide sleeve engageable with the thimble mount, a compression spring resiliently urging a plunger piston and the plunger lock guide sleeve in opposite directions for locking the thimble mount to the top head lock, a plunger guide lock slideably mounted in the plunger guide sleeve and threadedly connected to the plunger piston, a plunger mount removably connected to said plunger guide lock, a thimble connected to the thimble mount and cooperative with a mold above the thimble mount, a plunger slideably mounted in the thimble and being connected to the plunger mount, whereby the plunger and the thimble may be readily removed by removing the thimble mount from the top head lock and disengaging the plunger mount from the plunger guide lock.

6. In a cylinder for use in a glass bottle making machine, the improvement comprising, a top head lock secured to a thimble piston reciprocally mounted in a cylinder tube for movement within the tube, a thimble mount removably connected to the top head lock, a plunger lock guide sleeve engageable with the thimble mount, a compression plunger spring resiliently urging a plunger lock guide into engagement with the thimble mount to hold resiliently the thimble mount in locking engagement with the top head lock and also urging a plunger piston in an opposite direction within the thimble piston, a plunger guide lock slideably mounted in the plunger guide lock sleeve and threadedly connected to the plunger piston, said plunger guide lock having a C-shaped locking shoulder formed integral with its upper end, a plunger mount removably connected to said plunger guide lock, said plunger mount having an annular flange engageable with the C-shaped locking shoulder of the plunger guide lock to hold the plunger mount in an axial direction, an annular seal positioned between the plunger mount and the plunger guide lock resiliently holding the annular flange of the plunger mount in engagement with the C-shaped locking shoulder and sealing the space between the plunger mount and the plunger guide lock, a turtle shell removably mounted on the upper end of the cylinder, a pin fixed in said turtle shell for holding the turtle shell against rotation relative to said cylinder, a thimble connected to the thimble mount and passing through an aperture in the turtle shell for cooperation with a mold above the turtle shell, a plunger slideably mounted in the thimble and being connected to the plunger mount, whereby the plunger and the thimble may be readily removed by lifting the turtle shell from the cylinder, removing the thimble mount from the top head lock, and sliding the plunger mount radially of the plunger guide lock to disengage the plunger mount from the plunger guide lock.

7. In a cylinder for use in a glass bottle making machine, said cylinder having a cylinder tube and a cylinder support closing one end of said tube and supporting the cylinder in a vertical attitude, the improvement comprising, in combination, a thimble carriage axially movable in said cylinder tube, a thimble carriage base sealingly fixed to the thimble carriage for movement with the thimble carriage, a tube fixed to said thimble carriage base and slideably engaging the cylinder support to hold the thimble carriage and thimble carriage base against rotation, a top head lock fixed to the upper end of the thimble carriage adjacent to the upper end of the cylinder tube, said top head lock having a pair of integral opposed locking shoulders to define a non-circular aperture in an upper surface of the top head lock, a thimble mount removably held in the top head lock by said locking shoulders, said thimble mount having a non-circular base mateable with the non-circular aperture in the upper surface of the top head lock and said base having a pair of locking ledges engageable with the locking shoulders to lock the thimble mount in an axial direction, a plunger piston axially movable within the thimble carriage, said plunger piston having a plunger piston shank extending upward toward the upper end of the cylinder tube, a plunger lock guide threadedly mounted on the upper end of the plunger shank, a plunger lock guide sleeve slideably receiving the plunger lock guide and said plunger lock guide sleeve engageable with the lower surface of the thimble mount to hold resiliently the thimble mount in engagement with the top head lock, said thimble mount having a pair of spaced walls formed integral with the non-circular base, a thimble plate mounted on the upper end of said walls of the spaced walls of the thimble mount, a pair of spaced thimbles mounted on opposite ends of the thimble plate, a thimble locking plate secured to the thimble plate holding the thimbles onto the thimble plate, a compression plunger spring resiliently urging the plunger piston and the plunger lock guide sleeve in opposite directions to hold resiliently the plunger lock guide sleeve in engagement with the thimble mount, said plunger guide lock having a C-shaped locking shoulder formed integral with its uppper end, a plunger mount removably connected to said plunger guide lock, said plunger mount having an annular flange engageable with the C-shaped locking shoulder of the plunger guide lock to hold the plunger mount in an axial direction, an annular seal positioned between the plunger mount and the plunger guide lock resiliently holding the annular flange of the plunger mount in engagement with the C-shaped locking shoulder and sealing the space between the plunger mount and the plunger guide lock, said plunger mount having a plunger bench positioned between the support arms of the thimble mount and being axially movable between the thimble plate and the thimble mount base, a pair of plungers mounted on opposite ends of the plunger bench and being slideable in respective thimbles, and a turtle shell being non-rotatably mounted on the upper end of the cylinder tube and having a pair of apertures for slideably receiving the plungers, whereby the turtle shell non-rotatably mounted on the cylinder holds the plungers and thimbles in alignment with cooperation with a mold mounted above the turtle shell.

References Cited by the Examiner
UNITED STATES PATENTS

| | | | |
|---|---|---|---|
| 1,326,365 | 12/1919 | Miller | 65—362 |
| 1,342,056 | 6/1920 | Miller | 65—362 |
| 1,957,410 | 5/1934 | Miller | 65—243 |
| 2,290,798 | 7/1942 | Berthold | 65—243 |
| 2,309,378 | 1/1943 | Berthold | 65—243 |
| 2,508,890 | 5/1950 | Rowe | 65—321 X |
| 2,702,444 | 2/1955 | Rowe | 65—243 X |
| 2,755,597 | 7/1956 | Rowe | 65—167 |
| 2,826,867 | 3/1958 | Nava et al. | 65—229 |

DONALL H. SYLVESTER, *Primary Examiner.*

F. W. MIGA, *Assistant Examiner.*